(12) United States Patent
Seo et al.

(10) Patent No.: US 7,635,735 B2
(45) Date of Patent: Dec. 22, 2009

(54) POLYCARBONATE RESIN COMPOSITION AND MOLDED ARTICLES OF THE SAME

(75) Inventors: Kyung Hoon Seo, Seoul (KR); Kyung Tae Kim, Seoul (KR); Sung Sig Min, Seoul (KR); Bong Jae Lee, Seoul (KR)

(73) Assignee: Cheil Industries Inc., Gumi-si (KR)

( * ) Notice: Subject to any disclaimer, the term of this patent is extended or adjusted under 35 U.S.C. 154(b) by 379 days.

(21) Appl. No.: 11/474,031

(22) Filed: Jun. 23, 2006

(65) Prior Publication Data

US 2007/0010620 A1    Jan. 11, 2007

Related U.S. Application Data

(63) Continuation-in-part of application No. PCT/KR2004/003264, filed on Dec. 13, 2004.

(30) Foreign Application Priority Data

Dec. 23, 2003    (KR) .................. 10-2003-0095615

(51) Int. Cl.
*C08L 69/00*    (2006.01)

(52) U.S. Cl. .................. 525/67; 525/66; 525/433; 525/439; 252/299.01

(58) Field of Classification Search .......... None
See application file for complete search history.

(56) References Cited

U.S. PATENT DOCUMENTS

| | | | |
|---|---|---|---|
| 4,148,842 A | 4/1979 | Yu et al. | |
| 4,372,835 A | 2/1983 | Chung et al. | |
| 4,384,026 A | 5/1983 | Moore et al. | |
| 4,481,330 A | 11/1984 | Ohara et al. | |
| 4,677,162 A | 6/1987 | Grigo et al. | |
| 4,945,130 A * | 7/1990 | Genz et al. | 525/67 |
| 5,242,981 A | 9/1993 | Izumi et al. | |
| 5,346,320 A | 9/1994 | Nguyen | |
| 5,416,148 A | 5/1995 | Farah et al. | |
| 5,424,361 A * | 6/1995 | De Rudder | 525/67 |
| 5,543,448 A | 8/1996 | Laughner | |
| 5,830,940 A | 11/1998 | Nakamura et al. | |
| 5,859,146 A | 1/1999 | Kielhorn-Bayer et al. | |
| 7,271,212 B2 | 9/2007 | Oguni et al. | |
| 2002/0183425 A1 | 12/2002 | Romer et al. | |
| 2006/0094820 A1* | 5/2006 | Lee et al. | 525/67 |
| 2007/0010620 A1 | 1/2007 | Seo et al. | |

FOREIGN PATENT DOCUMENTS

| | | | |
|---|---|---|---|
| EP | 265791 | * | 5/1988 |
| JP | 58-59258 A | | 4/1983 |
| JP | 03-281561 A | | 12/1991 |
| JP | 09031309 | * | 2/1997 |
| JP | 10-279771 | | 10/1998 |
| JP | 2000-129111 A | | 5/2000 |
| KR | 1993-0004941 | | 6/1993 |
| KR | 10-2001-0019451 A | | 3/2001 |
| KR | 2001-0038924 A | | 5/2001 |
| WO | 2005/061621 A1 | | 7/2005 |

OTHER PUBLICATIONS

Hiemenz, Polymer Chemistry, (Marcel Dkker, 1984), pp. 34-43, QD 381.H52.
Office Action in commonly owned U.S. Appl. No. 11/260,700, mailed on Mar. 17, 2008.
International Search Report in commonly owned International Application No. PCT/KR2005/003567, mailed Jan. 31, 2006.
International Search Report in counterpart International Application No. PCT/KR2004/003264, mailed Mar. 24, 2005.

* cited by examiner

*Primary Examiner*—David Buttner
(74) *Attorney, Agent, or Firm*—Summa, Additon & Ashe, P.A.

(57) ABSTRACT

The polycarbonate resin composition having good fatigue strength according to the present invention comprises (A) 80 to 98 parts by weight of a polycarbonate resin, (B) 0.1 to 10 parts by weight of a thermotropic aromatic liquid crystalline polymer resin and (C) 1 to 20 parts by weight of a core-shell grafted copolymer.

15 Claims, No Drawings

POLYCARBONATE RESIN COMPOSITION AND MOLDED ARTICLES OF THE SAME

CROSS-REFERENCE TO RELATED APPLICATIONS

This application is a continuation-in-part application under 35 U.S.C. § 365 (c) claiming the benefit of the filing date of PCT Application No. PCT/KR2004/003264 designating the United States, filed Dec. 13, 2004. The PCT Application was published in English as WO 2005/061621 A1 on Feb. 24, 2005, and claims the benefit of the earlier filing date of Korean Patent Application No. 10-2003-0095615, filed Dec. 23, 2003. The contents of the PCT Application including its international publication and Korean Patent Application No. 10-2003-0095615 are incorporated herein by reference in their entirety.

BACKGROUND OF THE INVENTION

1. Field of the Invention

The invention relates to a polycarbonate resin composition, molded articles at least partially made of the polycarbonate resin composition and electronic devices comprising at least one molded part made of the polycarbonate resin composition, and methods of making the same.

2. Description of the Related Art

Polycarbonate resins have been widely used as an engineering plastic material. Particularly, the polycarbonate resins are extensively used in housings and other parts of portable electronic devices including mobile phones. Certain physical or mechanical properties of these polycarbonate-based articles may deteriorate as these articles are used frequently. For example, many polycarbonate-based articles show significant reduction in their impact resistance and/or fatigue resistance when used in portable electronic devices. Specifically, polycarbonate-based electronic devices exhibit fatigue in parts that move or are moveable.

It is well known in the art that fillers, when mixed with a polycarbonate resin, may provide enhanced fatigue strength. However, the combination of fillers with a polycarbonate resin often results in deterioration of impact strength and aesthetic appeal. In addition, the fillers may also result in surface defects in the polycarbonate based article. Accordingly, there is a need to develop polycarbonate resin compositions having improved fatigue strength while maintaining the composition's impact resistance and outward physical appearance when exposed to environmental stress such as that provided by moveable parts.

SUMMARY OF THE INVENTION

Described herein are compositions comprising a polycarbonate resin. These polycarbonate compositions comprise a polycarbonate resin, a liquid crystalline polymer resin, and a core-shell graft copolymer. In certain embodiments, the polycarbonate composition comprises about 80 to about 98 parts by weight of a polycarbonate resin, about 0.1 to about 10 parts by weight of a liquid crystalline polymer resin; and about 1 to about 20 parts by weight of a core-shell graft copolymer.

In some embodiments, the liquid crystalline polymer resin is an aromatic polyester resin. In another embodiment, the liquid crystalline polymer resin is an aromatic polyester amide resin. In certain embodiments, the liquid crystalline polymer resin is thermotropic.

In some embodiments, the liquid crystalline polymer resin comprises one or more repeating units selected from the group consisting of Chemical Formula (1), Chemical Formula (2), and Chemical Formula (3):

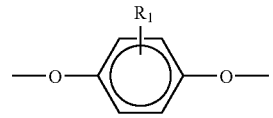

[Chemical Formula 1]

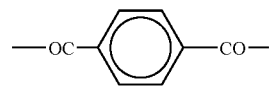

[Chemical Formula 2]

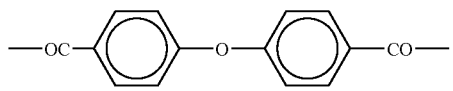

[Chemical Formula 3]

In Chemical Formula 1, $R_1$ is methyl, ethyl, or halogen. In some embodiments, there also may be more than $R_1$ present on the phenylene substitutent of Chemical Formula 1.

In other embodiments, the liquid crystalline polymer resin comprises one or more repeating units as shown in the following Chemical Formula 4:

[Chemical Formula 4]

In Chemical Formula 4, A is O or NH. In some of these embodiments, the liquid crystalline polymer also comprises one or more repeating units selected from the group consisting of Chemical Formula (1), Chemical Formula (2), and Chemical Formula (3).

In some embodiments, the core-shell graft copolymer is a graft copolymer of a rubber core and a vinyl monomer or polymer. In certain embodiments, the rubber core comprises a polymer of one or more monomers selected from the group consisting of $C_4$-$C_6$ diene rubber monomer, acrylate rubber monomer, and silicone rubber monomer. To the rubber core, one or more vinyl monomers or one or more polymers of one or more of the vinyl monomers may be graft polymerized thereto. In certain embodiments, the vinyl monomer or polymer comprises one or more monomers selected from the group consisting of $C_1$-$C_8$ methacrylic acid, alkyl esters, $C_1$-$C_8$ acrylic acid alkyl esters, maleic acid anhydrides, $C_1$-$C_4$ N-alkyl maleimides, and N-aryl maleimides.

In some embodiments, the polycarbonate composition has improved physical or mechanical properties. In one embodiment, the polycarbonate composition has fatigue resistance of at least about 169,000 when a specimen of the composition is tested at 5000 psi at 5 times per second according to the standard ASTM D638. In some embodiments, the composition has fatigue resistance of at least about 210,000 when a specimen of the composition is tested at 5000 psi at 5 times per second according to the standard ASTM D638. In some embodiments, the composition has fatigue resistance of at least about 251,000 when a specimen of the composition is tested at 5000 psi at 5 times per second according to the standard ASTM D638.

In addition, some polycarbonate compositions as described herein have impact strength of at least about 71 kgf·cm/cm when the specimen is tested according to the standard ASTM D256 (⅛" notched) at 23° C. In some embodiments, the polycarbonate composition has impact strength of at least about 72 kgf·cm/cm when the specimen is tested according to the standard ASTM D256 (⅛" notched) 23° C. In some embodiments, the polycarbonate composition has impact strength of at least about 73 kgf·cm/cm when the specimen is tested according to the standard ASTM D256 (⅛" notched) 23° C.

In certain embodiments, the composition can be formed into a molded article. Thus, one embodiment includes a molded article comprising the polycarbonate composition as described herein. Another embodiment includes an electronic device comprising the polycarbonate compositions as described herein.

Also described herein is a method of making an electronic device, comprising shaping the polycarbonate composition into a molded article, providing at least one electrical part of an electronic device, and connecting the molded article with the at least one electrical part. Another embodiment includes the electronic device produced by such a process.

DETAILED DESCRIPTION OF THE PREFERRED EMBODIMENT

As noted above, one aspect of the invention provides a polycarbonate composition. According to various embodiments of the invention, the polycarbonate composition comprises a polycarbonate resin, a liquid crystalline polymer resin, and a core-shell grafted copolymer. The polycarbonate compositions of the embodiments of the invention show enhanced physical or mechanical properties as compared to other polycarbonate compositions less one or more components. In some particular embodiments, shaped articles and electronic devices comprising the polycarbonate compositions as described herein show enhanced physical or mechanical properties. As will be discussed, the polycarbonate compositions according to some embodiments of the invention have good fatigue strength. In further embodiments, the polycarbonate compositions have good fatigue strength and impact resistance.

The components of the polycarbonate compositions are further described herein.

Polycarbonate Resin

The polycarbonate resin used in embodiments includes a polycarbonate compound or a mixture of two or more polycarbonate compounds. The resulting polymer of the polycarbonate compound or mixture of two or more polycarbonate compounds is also referred to as a polycarbonate resin. The polycarbonate compounds include homopolymers or copolymers containing a repeating ester group. For example, the polycarbonate compounds include linear or branched polycarbonate compounds, and further include polyester carbonate copolymers, silicone-polycarbonate copolymers, and other copolymers containing carbonate. The skilled artisan will appreciate additional examples of the polycarbonate compounds.

Typically, one or more polycarbonate compounds may be obtained from a reaction of one or more diphenols with a carbonate precursor or phosgene in the presence of a molecular weight controlling agent and usually in the presence of a catalyst. A reaction involving two diphenols may result in a copolymeric polycarbonate compound. Typical examples of the diphenol used include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called bisphenol A), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{(3-isopropyl-4-hydroxy)phenyl}propane, 2,2-bis {(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 2,2-bis-(3,5-dichloro-4-hydroxyphenyl)-propane, 2,2-bis-(3,5-dibromo-4-hydroxyphenyl)-propane 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α, α'-bis(4-hydroxyphenyl)-o-diisopropylbenzene, α,α'-bis(4-hydroxyphenyl)-m-diisopropylbenzene, α, α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. Typically, the carbonate precursor is a carbonyl halide, carbonate ester, haloformate or the like. Specific examples of the carbonate precursor include phosgene, diphenyl carbonates and dihaloformates of diphenols.

In one embodiment, the polycarbonate compound includes 2,2-bis-(4-hydroxyphenyl)-propane polycarbonate compound, which is a linear polycarbonate compound. In another embodiment, a branched polycarbonate compound can be obtained by reacting a polyfunctional aromatic compound such as trimelitic anhydride and trimelitic acid with dihydric phenol and a carbonate precursor. In another embodiment, another polycarbonate compound can be obtained by reacting a difunctional carboxylic acid with dihydric phenol and a carbonate precursor.

In some embodiments, the polycarbonate composition comprises about 80 to about 98 parts by weight of a polycarbonate resin, which includes, for example, 80, 81, 82, 83, 84, 85, 86, 87, 88, 89, 90, 91 92, 93, 94, 95, 96, 97, 97, or 98 parts by weight. In certain embodiments, the polycarbonate composition comprises an amount of a polycarbonate resin ranged between two of the foregoing values. In other embodiments, the polycarbonate composition comprises about 70 to about 80 parts by weight. In a few embodiments, the polycarbonate composition comprises up to 99.5 parts by weight of the polycarbonate resin. Here, the unit "parts by weight" refers to a relative weight of each component given that the total weight of the polycarbonate resin, liquid crystalline polymer resin, core-shell grafted copolymer and low molecular weight polyolefin is 100 parts by weight.

Liquid Crystalline Polymer Resin

The liquid crystalline polymer resin used in embodiments of the invention includes an aromatic polyester compound, an aromatic polyester amide compound or a mixture of a liquid crystalline polymer compounds. These resins may generally be referred to as thermotropic as they change their phases over temperature. Without wishing to be bound to any particular theory, the liquid crystalline polymer may be understood to refer to what is mixed in the composition as it existed both before, during, and after forming the polycarbonate composition and after forming a molded article according to embodiments of the invention. Suitable polyester resin and aromatic polyester amide resins are disclosed in European Patent Nos. 0191705 and 0272992, and U.S. Pat. Nos. 4,161,470 and 4,330,457.

In some embodiments, the aromatic polyester resin has at least one repeating unit selected from the group consisting of Chemical Formula 1 ("repeating unit 1"), Chemical Formula 2 ("repeating unit 2") and Chemical Formula 3 ("repeating unit 3").

[Chemical Formula 1]

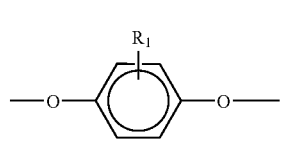

In the foregoing formula, $R_1$ is methyl, ethyl, a halogen.

[Chemical Formula 2]

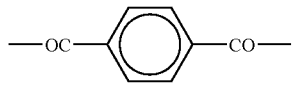

[Chemical Formula 3]

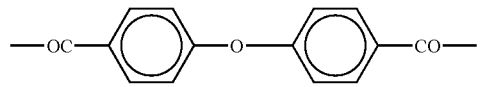

In one embodiment, the aromatic polyester compound comprises one or more of repeating units 1, 2 and 3. More specifically, in the aromatic polyester compound of an embodiment, the mole ratio of the repeating unit 1 to the sum of the repeating units 2 and 3 is about 50 mol %. In some additional embodiments, the mole ratio of the repeating unit 2 to the sum of the repeating units 2 and 3 is 0 to about 70 mol %, and the mole ratio of the repeating unit 3 to the sum is about 30 to 100 mol %.

In another embodiment, the liquid crystalline polymer resin comprises one or more repeating units selected from repeating unit 2 and 3. In the foregoing embodiment with the repeating units 2 and 3, more specifically, the mole ratio of the repeating unit 2 to the sum of the repeating units 2 and 3 is 0 to about 70 mol %, and the mole ratio of the repeating unit 3 to the sum is about 30 to 100 mol %.

In some embodiments, the liquid crystalline polymer compound comprises an aromatic polyester amide compound, which includes Chemical Formula 4 ("repeating unit 4"). In addition to the repeating unit 4, in certain embodiments, the aromatic polyester amide compound may further include at least one of Chemical Formula 1, 2 and 3.

[Chemical Formula 4]

In the foregoing formula, A is O or NH.

In one embodiment, the aromatic polyester amide compound comprises one or more of repeating unit 4, where A is O. In the foregoing embodiment, the aromatic polyester amide compound may also include one or more of repeating units 1 and 2. In some of these embodiments, repeating unit 1 is about 25 to about 90 mol % and repeating unit 2 is about 10 to about 75 mol %, as compared to each other.

In another embodiment, the aromatic polyester amide compound comprises one or more of repeating unit 4, where A is NH. In the foregoing embodiments, the aromatic polyester amide compound may also comprise one or more of repeating units 1 and 2. In some of these embodiments, repeating unit 1 is about 0 to about 95 mol % and repeating unit 2 is about 5 to about 100 mol %, as compared to each other.

In some embodiments, the liquid crystalline polymer compound comprises an aromatic polyester amide compound, which includes Chemical Formula 5 ("repeating unit 5"). In addition to the repeating unit 5, in certain embodiments, the aromatic polyester amide compound may further include at least one of Chemical Formula 1, 2, 3 and 4.

[Chemical Formula 5]

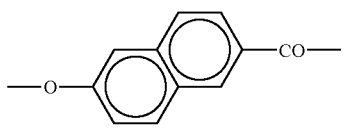

In some embodiments, the liquid crystalline polymer compound comprises an aromatic polyester amide compound, which includes Chemical Formula 6 ("repeating unit 6"). In addition to the repeating unit 6, in certain embodiments, the aromatic polyester amide compound may further include one or more of Chemical Formula 1, 2, 3, 4 and 5.

[Chemical Formula 6]

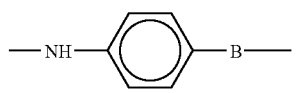

In one embodiment, the aromatic polyester amide compound comprises one or more of repeating units 2, 5 and 6. More specifically, in the aromatic polyester compound of an embodiment, the mole ratio of the repeating unit 5 to the sum of the repeating units 2 and 6 is about 10 to about 90 mol %. In the foregoing embodiment with respect to the repeating units 2, the mole ratio of the repeating unit 2 to the sum of the repeating units 5 and 6 is 5 to about 45 mol %. In the foregoing embodiment with respect to the repeating units 6, the mole ratio of the repeating unit 6 to the sum of the repeating units 2 and 5 is about 5 to about 45 mol %.

In some embodiment, the liquid crystalline polymer compound comprises one or more of repeating unit selected from the group consisting of Chemical Formula 7 ("repeating unit 7"), Chemical Formula 8 ("repeating unit 8"), Chemical Formula 9 ("repeating unit 9"), and Chemical Formula 10 ("repeating unit 10"). In addition to the repeating units 7, 8, 9, or 10, in certain embodiments, the liquid crystalline polymer compound may further include one or more of Chemical Formula 1, 2, 3, 4, 5, 6 or 7.

[Chemical Formula 7]

-continued

[Chemical Formula 8]

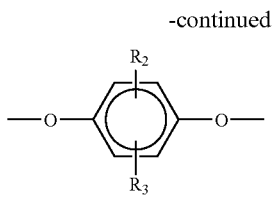

In the foregoing formula, $R_2$ and $R_3$ are independently methyl, ethyl, or halogen.

[Chemical Formula 9]

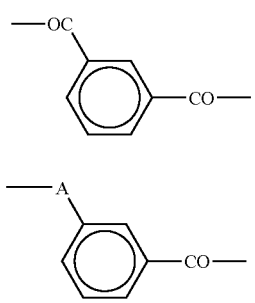

[Chemical Formula 10]

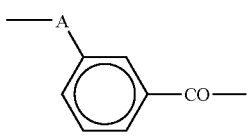

In the forgoing formula, A is O or NH.

In some embodiments, the liquid crystalline polymer comprises about 10 mole % of repeating units 7, 8, 9, or 10 as compared to repeating unit 1.

In embodiments, the polycarbonate composition comprises about 0.1 to about 10 parts by weight of a liquid crystalline polymer resin, which includes, for example, 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.1, 9.5, 10, parts by weight. In certain embodiments, the polycarbonate composition comprises an amount of a liquid crystalline polymer resin ranged between two of the foregoing values. In one embodiment, the polycarbonate composition comprises about 0.1 to about 7 parts by weight of a liquid crystalline polymer resin. In another embodiment, the polycarbonate composition comprises about 0.1 to about 5 parts by weight of a liquid crystalline polymer resin.

Core-Shell Graft Copolymer

The core-shell graft copolymer used in embodiments of the invention is a copolymer comprising a core polymer and a plurality of polymers or monomers grafted from the core polymer. In some embodiments, the core polymer includes a rubber. In some embodiments, the polymers and monomers grafted to the core are vinyl polymers or monomers. In embodiments, the core is in an amount of about 50 to about 90 parts by weight with reference to the total weight of the core-shell graft copolymer.

In certain embodiments, the polymers grafted onto the core is formed by grafting with one or more monomers selected from the group consisting of styrene, (α-methylstyrene, halogen- or alkyl-substituted styrene, acrylonitrile, methacrylonitrile, $C_1$-$C_8$ methacrylic acid alkyl esters, $C_1$-$C_8$ acrylic acid alkyl esters, maleic acid anhydrides, $C_1$-$C_4$ alkyl and phenyl nuclear-substituted maleimide. The $C_1$-$C_8$ methacrylic acid alkyl esters and $C_1$-$C_8$ acrylic acid alkyl esters may be monohydryl alcohols of $C_1$-$C_8$ as esters of methacrylic acid and acrylic acid, respectively. In certain embodiments, the esters are methacrylic acid methyl ester, methacrylic acid ethyl ester and methacrylic acid propyl ester.

In some embodiments, the rubber is polymerized with at least one of diene rubber monomer, acrylate rubber monomer and silicone rubber monomer. In some embodiments, a $C_4$-$C_6$ diene rubber monomers are used. For example, the diene rubbers are butadiene rubber, acryl rubber, ethylene/propylene rubber, styrene/butadiene rubber, acrylonitrile/butadiene rubber, isoprene rubber, copolymer of ethylene-propylene-diene (EPDM), and so forth. For example, the acrylate rubber monomers are methyl acrylate, ethyl acrylate, n-propyl acrylate, n-butyl acrylate, 2-ethylhexyl acrylate, hexyl methacrylate, 2-ethylhexyl methacrylate, and so forth. In certain embodiment, a hardening agent may be used. Examples of the hardening agents include ethylene glycol dimethacrylate, propylene glycol dimethacrylate, 1,3-buylene glycol dimethacrylate, 1,4-buylene glycol dimethacrylate, allyl methacrylate, and triallyl cyanurate, and so forth.

Further, the silicone rubber monomers may be prepared from cyclosiloxane, and the examples of the silicone rubber monomers include, but are not limited to, hexamethyl cyclotrisiloxane, octamethyl cyclotetrasiloxane, decamethyl cyclopentasiloxane, dodecamethyl cyclohexasiloxane, trimethyltriphenyl cyclotrisiloxane, tetramethyltetraphenyl cyclotetrasiloxane, and octaphenyl cyclotetrasiloxane. In certain embodiments, a hardening agent may be used for preparation of the silicone rubber. The examples of the hardening agent include, but are not limited to, trimethoxymethylsilane, triethoxyphenylsilane, tetramethoxysilane, and tetraethoxysilane.

In some embodiments, the polycarbonate composition comprises about 1 to about 20 parts by weight of a core-shell grafted copolymer, which includes, for example, 1, 1.5, 2, 2.5, 3, 3.5, 4, 4.5, 5, 5.5, 6, 6.5, 7, 7.5, 8, 8.5, 9, 9.1, 9.5, 10, 10.5, 11, 11.5, 12, 12.5, 13, 13.5, 14, 14.5, 15, 15.5, 16, 16.5, 17, 17.5, 18, 18.5, 19, 19.5 and 20 parts by weight. In certain embodiments, the polycarbonate composition comprises an amount of a core-shell grafted copolymer ranged between two of the foregoing values. In one embodiment, the polycarbonate composition comprises about 1 to about 10 parts by weight of a core-shell grafted copolymer.

Additional Components

The polycarbonate composition may additionally comprise one or more other additives such as organic fillers, like glass fiber, carbon fiber, talc, silica, mica, and alumina. In some particular embodiments, the organic filler may be added to improve mechanical strength and/or the heat distortion temperature of the polycarbonate compositions. The composite materials can contain one or more of an ultraviolet absorbing agent, a heat stabilizer, an antioxidant, a flame retardant, a lubricant, a colorant, such as a pigment or dye, in addition to the foregoing components. Additional components or additives may be added to provide additional properties or characteristics to the composite material or to modify existing properties of the composite material. One of ordinary skill in the art will appreciate that various additives may be added to the composite materials according to some embodiments.

Properties of the Polycarbonate Composition

An advantage of certain embodiments is to provide a thermoplastic resin composite material with improved physical and mechanical properties. Such properties include, but are not limited to, impact strength and fatigue resistance.

Some embodiments comprising the polycarbonate resin, the liquid crystalline polymer resin, and the core-shell graft copolymer have impact strength of greater than or equal to about 71 kgf·cm/cm, more preferably greater than or equal to about 72 kgf·cm/cm, and even more preferably greater than or equal to about 73 kgf·cm/cm, when a specimen of the polycarbonate composition is tested according to the standard ASTM D256 (⅛" notched) at 23° C.

Some embodiments comprising the polycarbonate resin, the liquid crystalline polymer resin, and the core-shell graft copolymer have fatigue resistance of greater than or equal to about 150,000, and more preferably greater than or equal to about 200,000, and even more preferably, greater than or equal to about 250,000, when a specimen of the polycarbonate composition was tested under the standard ASTM D638 with the specimen being subjected to a 5000 psi stress at five times per second repeatedly along the longitudinal direction until fatigue destruction occurred.

In certain embodiments, the polycarbonate compositions have better qualities over other compositions less one or more components of the polycarbonate composition as described herein. In certain of these embodiments, the polycarbonate compositions have both enhanced impact strength and fatigue resistance as described above.

Shaped Articles

A shaped article can be made using the polycarbonate composition according to the foregoing embodiments. In some embodiments, this article is molded into various shapes. An extrusion molding machine such as a vented extruder may be used. The polycarbonate composition of embodiments may be molded into various moldings using, for example, a melt-molding device. In embodiments, the polycarbonate composition material is formed into a pellet, which then may be molded into various shapes using, for example, injection molding, injection compression molding, extrusion molding, blow molding, pressing, vacuum forming or foaming. In one embodiment, the polycarbonate composition can be made into a pellet using melt-kneading, and the resulting pellets are molded into moldings through injection molding or injection compression molding.

In some embodiments, the polycarbonate composition can be applied to portable mobile communications devices, precision electrical parts and devices, precision automobile parts and other various articles which require excellent fatigue strength as well as mechanical strength such as impact strength.

As noted, in one embodiment, the polycarbonate composition is formed into pellets. In other embodiments, the polycarbonate composition is formed into structural parts of various consumer products, including electronic devices and appliances. In some embodiments, the polycarbonate composition may be molded into a housing or body of electronic or non-electronic devices. Examples of electrical devices, in which a molded article made of the blend of the polycarbonate composition according to embodiments of the invention are used, include printers, computers, word processors, keyboards, personal digital assistants (PDA), telephones, mobile phones, cameras, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polycarbonate composition as herein described. Some embodiments provide a method of making an electronic device, comprising providing an electrical circuit, providing a housing comprising a portion, and enclosing at least part of the electrical circuit with the housing, wherein the portion comprises embodiments of the polycarbonate composition as herein described.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

In the following examples, as for the polycarbonate resin, a linear polycarbonate resin of 2,2-bis-(4-hydroxyphenyl)-propane polycarbonate, "PANLITE L-1250 WP" available from TEIJIN, with an average molecular weight ($M_w$) of about 25,000 g/mol was used. As for the liquid crystalline polymer resin, a liquid crystalline polymer resin, "UENO LCP A5000" available from UENO Co. with a melting point of 280° C., a specific gravity of 1.40, was used. As for the core-shell graft copolymer, a core-shell graft copolymer "PALALOID EXL-2602" manufactured by KUREHA Co., with a weight average particle size of about 0.1 µm, and in which about 20 to about 30 parts by weight of methacrylic acid monomers were grafted onto about 70 to about 80 parts by weight of butadiene rubber, was used.

Examples 1-4

The components as shown in Table 1 were mixed in a conventional mixer and the mixture was extruded through a twin screw extruder with Φ=45 mm to prepare a product resin in pellet form. The resin pellets were dried at 110° C. over 3 hours and molded into test specimens using a 10 oz injection molding machine at injection temperature of 280-320° C. and at mold temperature of 60-90° C.

Comparative Examples 1-3

Comparative Examples 1-3 were conducted in the same manner as in Example 1 except the composition of the components were varied. The components of the Comparative Examples is also shown in Table 1.

Impact Strength

Impact strength refers to mechanical strength of a sample relating to resistance to certain impacts thereto. The specimens were prepared and tested according to the standard, ASTM D256 (⅛" notched) at temperature of 23° C. and relative humidity of 50%. The impact strength was measured in the unit "kgf·cm/cm."

Fatigue Resistance

Fatigue resistance refers to a mechanical property of a sample relating to resistance to repeated application of force onto the sample. The fatigue resistance of the specimens was tested according to the standard, ASTM D638, while repeatedly applying pressure 5000 psi at 5 times per second onto the test specimens along the longitudinal direction until the fatigue destruction occurs. The number is the number of impacts that the sample withstood before fatigue destruction occurred.

Unless otherwise indicated, all test occurred at 23° C. The test results are also shown in Table 1.

TABLE 1

|  | Examples | | | | Comparative Examples | | |
| --- | --- | --- | --- | --- | --- | --- | --- |
|  | 1 | 2 | 3 | 4 | 1 | 2 | 3 |
| Components |
| Polycarbonate Resin | 94 | 90 | 96 | 92 | 100 | 95 | 84 |
| Liquid Crystalline Polymer Resin | 3 | 5 | 1 | 3 | 0 | 0 | 11 |
| Core-Shell Graft Copolymer | 3 | 5 | 5 | 5 | 0 | 5 | 5 |
| Test |
| Impact Strength (kgf cm/cm) | 71 | 71 | 73 | 72 | 73 | 65 | 48 |
| Fatigue Test (times) | 223,000 | 251,000 | 169,000 | 210,000 | 101,000 | 88,000 | 272,000 |

As shown in Table 1, Examples 1 to 4 employing a liquid crystalline polymer resin (B) and a core-shell grafted copolymer (C) in appropriate ratio are demonstrated good fatigue strength compared to Comparative Example 1 of pure polycarbonate and Comparative Example 2 of polycarbonate and core-shell graft copolymer. Comparative Example 3 shows that the fatigue strength is excellent but the impact strength is deteriorated.

The skilled artisan will recognize the interchangeability of various features from different embodiments. Similarly, the various features and steps discussed above, as well as other known equivalents for each such feature or step, can be mixed and matched by one of ordinary skill in this art to perform methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein.

What is claimed is:

1. A polycarbonate composition having a fatigue resistance of at least about 169,000 when a specimen of the composition is tested at 5000 psi at 5 times per second according to the standard ASTM D638 said composition consisting essentially of:
   about 80 to about 98 parts by weight of a polycarbonate resin;
   about 0.1 to about 7 parts by weight of a liquid crystalline polymer resin; and
   about 1 to about 20 parts by weight of a core-shell graft copolymer, wherein the core is a rubber core and comprises about 50 to about 90 parts by weight of the total weight of the core-shell graft copolymer.

2. The polycarbonate composition of claim 1, wherein the liquid crystalline polymer resin is an aromatic polyester resin or an aromatic polyester amide resin.

3. The polycarbonate composition of claim 2, wherein the liquid crystalline polymer resin comprises one or more repeating units selected from the group consisting of Chemical Formula (1), Chemical Formula (2), and Chemical Formula (3):

[Chemical Formula 1]

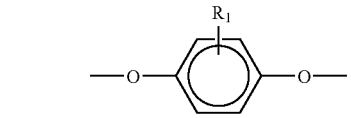

[Chemical Formula 2]

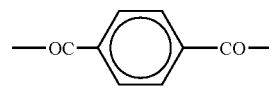

[Chemical Formula 3]

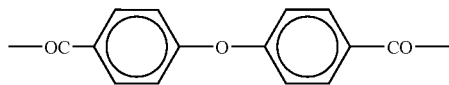

wherein $R_1$ is methyl, ethyl, or halogen.

4. The polycarbonate composition of claim 3, wherein the liquid crystalline polymer resin comprises one or more of a repeating unit as shown in the following Chemical Formula (4):

[Chemical Formula 4]

wherein A is O or NH; and
wherein the liquid crystalline polymer also comprises one or more repeating units selected from the group consisting of Chemical Formula (1), Chemical Formula (2), and Chemical Formula (3).

5. The polycarbonate composition of claim 1, wherein the core-shell graft copolymer is a graft copolymer of a rubber core and a vinyl monomer or polymer.

6. The polycarbonate composition of claim 5, wherein the rubber core comprises a polymer of one or more monomers selected from the group consisting of $C_4$-$C_6$ diene rubber monomer, acrylate rubber monomer, and silicone rubber monomer.

7. The polycarbonate composition of claim 5, wherein the vinyl monomer or polymer comprises one or more monomers selected from the group consisting of $C_1$-$C_8$ methacrylic acid alkyl esters, $C_1$-$C_8$ acrylic acid alkyl esters, maleic acid anhydrides, $C_1$-$C_4$ N-alkyl maleimides, and N-phenyl maleimide.

8. The polycarbonate composition of claim 1, comprising about 0.1 to about 5 parts by weight of the liquid crystalline polymer resin.

9. The polycarbonate composition of claim 1, wherein the composition has fatigue resistance of at least about 210,000 when a specimen of the composition is tested at 5000 psi at 5 times per second according to the standard ASTM D638.

10. The polycarbonate composition of claim 1, wherein the composition has fatigue resistance of at least about 251,000 when a specimen of the composition is tested at 5000 psi at 5 times per second according to the standard ASTM D638.

11. The polycarbonate composition of claim 1, wherein the composition has impact strength of at least about 71 kgf·cm/cm when the specimen is tested according to the standard ASTM D256 (⅛" notched) at 23° C.

12. The polycarbonate composition of claim 1, wherein the composition has impact strength of at least about 72 kgf·cm/cm when the specimen is tested according to the standard ASTM D256 (⅛" notched) at 23° C.

13. The polycarbonate composition of claim 1, wherein the composition has impact strength of at least about 73 kgf·cm/cm when the specimen is tested according to the standard ASTM D256 (⅛" notched) at 23° C.

14. A molded article comprising the composition of claim 1.

15. An electronic device comprising the composition of claim 1.

* * * * *

UNITED STATES PATENT AND TRADEMARK OFFICE
CERTIFICATE OF CORRECTION

PATENT NO. : 7,635,735 B2  Page 1 of 1
APPLICATION NO. : 11/474031
DATED : December 22, 2009
INVENTOR(S) : Seo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 561 days.

Signed and Sealed this

Twenty-first Day of December, 2010

David J. Kappos
*Director of the United States Patent and Trademark Office*